United States Patent [19]

Rosin et al.

[11] 4,124,133

[45] Nov. 7, 1978

[54] MOLTEN METAL DELIVERY CARRIER

[75] Inventors: George C. Rosin, South Euclid; Robert E. Kulon, Willowick, both of Ohio

[73] Assignee: McNeil Corporation, Akron, Ohio

[21] Appl. No.: 720,558

[22] Filed: Sep. 7, 1976

[51] Int. Cl.[2] .................... B65G 47/00

[52] U.S. Cl. .................... 214/707; 212/130; 214/313; 214/730

[58] Field of Search .................... 212/130; 214/707, 730, 214/313

[56] References Cited

U.S. PATENT DOCUMENTS

| | | | |
|---|---|---|---|
| 1,558,746 | 10/1925 | Moore | 212/130 |
| 1,748,232 | 2/1930 | Lane | 212/130 |
| 2,647,651 | 8/1953 | Vincent | 214/707 |
| 2,870,927 | 1/1959 | Warren | 214/313 |
| 3,226,783 | 1/1966 | Draxler | 214/707 |
| 3,277,539 | 10/1966 | Haberlin | 212/130 |

FOREIGN PATENT DOCUMENTS

| | | | |
|---|---|---|---|
| 888,677 | 9/1953 | Fed. Rep. of Germany | 214/707 |

*Primary Examiner*—Lawrence J. Oresky
*Attorney, Agent, or Firm*—Watts, Hoffmann, Fisher & Heinke, Co.

[57] ABSTRACT

An overhead monorail molten metal delivery self-propelled carrier comprising a carrier frame structure support on an overhead monorail, a power actuated hoist on the carrier frame connected by depending flexible members to a second movable structure or carriage for raising and lowering the latter relative to the carrier frame, cooperating guide members on depending vertical masts forming part of the carrier frame and the second structure or carriage confining the carriage to a predetermined vertical movement relative to the carrier frame, a third movable structure or ladle frame supported on horizontal trucks forming a part of the second structure for movement transversely of the path of movement of the carrier frame structure, power actuated mechanism for moving the third structure or ladle frame horizontally relative to the second structure or carriage, a second power actuated hoist on said third structure or ladle frame connected to a molten metal ladle support structure or ladle sub-frame having a ladle firmly clamped thereto for raising and lowering the latter relative to the third structure or ladle frame and cooperating guide means on the third structure or ladle frame and the ladle support structure or ladle and frame confining the ladle support structure or ladle sub-frame to a predetermined movement relative to the third structure or ladle frame about an axis parallel with the path of movement of the carrier and offset horizontally to one side thereof such that it passes through the tip of the ladle pouring spout.

4 Claims, 4 Drawing Figures

MOLTEN METAL DELIVERY CARRIER

BACKGROUND OF THE INVENTION

1. Field of the Invention

The invention relates to material handling apparatus of the traveling hoist type for delivering molten metal to a mold.

2. Description of the Prior Art

Heretofore molten metal has typically been delivered to molds by surface ladle car vehicles or cars, discrete ladles handled in various ways including overhead bridge cranes, see for example U.S. Pat. No. 3,111,228.

SUMMARY OF THE INVENTION

The present invention provides a novel and improved overhead monorail traveling hoist apparatus or carrier for delivering molten metal to a mold or the like while either stationary or moving and, if desired, to a series of molds the openings of which are not necessarily aligned with one another, which apparatus is relatively simple in construction, inexpensive to manufacture, convenient to operate and reliable in operation.

More specifically, the invention provides an apparatus of the character referred to comprising a monorail supported traveling carrier having an elevatable structure or ladle frame which includes a sub-frame having a molten metal ladle secured thereto and mechanism for moving the sub-frame in a circular arc path the center of which is located at the tip of the ladle pouring spout.

The invention further provides an apparatus of the character referred to comprising a monorail supported carrier movable along a row of molds and having an elevatable structure including a sub-frame having a molten metal ladle secured thereto which subframe is movable in a circular arc the center of which is located at the tip of the ladle pouring spout in combination with mechanism for moving the ladle frame transversely of the row of molds.

Further objects and advantages of the invention will be hereinafter referred to and/or will become apparent from the drawings and the description of the preferred embodiment.

DESCRIPTION OF THE PREFERRED EMBODIMENT

Figure 1:
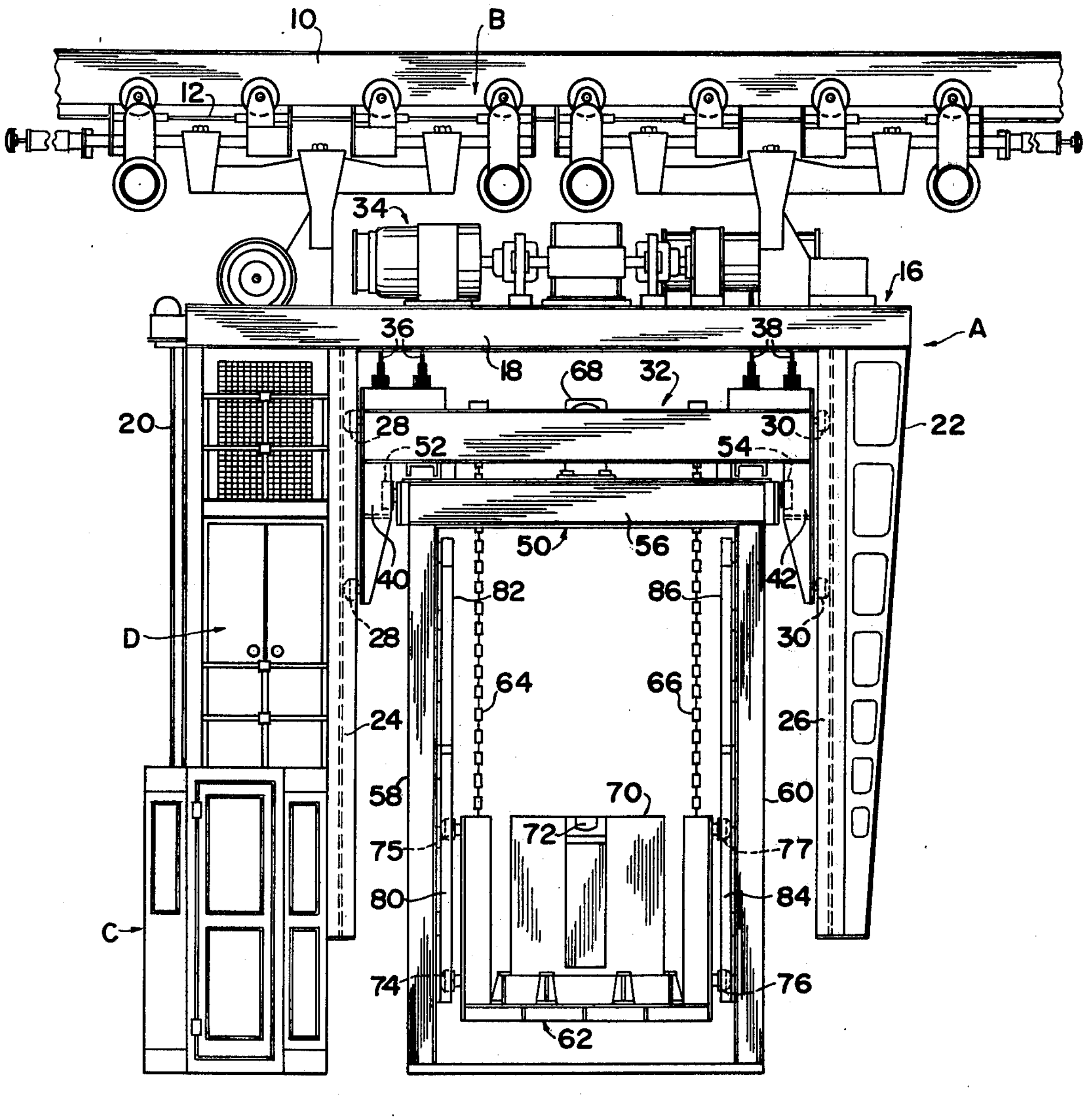
FIG. 1 is an elevation of an apparatus for delivering molten metal to a mold embodying the invention as viewed from the right of FIG. 2.

The apparatus which forms the preferred embodiment of the invention is a self-propelled material handling carrier designated generally by the reference character A, supported on and movable along an overhead monorail track B in a well known manner and especially designed for expeditious delivery of molten metal to a row of molds either stationary or movable. The track or trackway B comprises the rail 10 and suitable electric conductor bars 12 at opposite sides of the rail 10 for supplying electric power to the carrier A through electric current collectors, not shown, on the carrier in a well understood manner.

The carrier B comprises a first or carrier frame or frame structure 16 constructed largely of commercial steel structural members including a rectangular carrier sub-frame 18 elongated lengthwise of the rail 10 and from opposite ends of which depend structural assemblies or masts 20,22 including I-beams 24,26 the sides of which facing one another provide vertical extending channel-like guideways within which engage vertically spaced rollers 28,30 on opposite ends of a vertically movable second elongated rectangular frame structure or carriage 32. The mast 20 depends from the left-hand end of the frame 18, as viewed in FIG. 1 of the drawings and includes an operator's cab C, a control equipment cabinet D and other apparatus all of which is commercially available, and a detailed description of which is not included as it is not necessary to an understanding of the present invention.

The structural frame of member or carriage 32 is raised and lowered relative to the carrier frame 16 by an electric motor driven dual drum hoist 34 on the carrier frame 16 from which it is suspended by pairs of cables 36,38 connected thereto adjacent to its opposite ends. Because of the vertical spacing of the pairs of rollers 28,30 the carriage member 32 is prevented from pivoting about an axis parallel with the length of the carrier frame 16 and when raised or lowered by operation of the hoist 34 its movement is confined to a predetermined vertical linear path.

The carriage 32 includes two I-beam assemblies 40,42 adjacent to opposite ends thereof extending transversely, in the present instance, normal, to the length of the carriage 32 and in turn the length of the track B. The opposite ends of the I-beams are closed and their sides facing one another form horizontal tracks or trackways for a further elongated structural frame or ladle frame member 50 having horizontally spaced pairs of rollers 52,54 which engage and travel along the lower webs of the members 40,42. Suitable power actuated means is provided for positioning and if desired holding the ladle frame 50 in any selected position in the runway formed by the members 40,42, such as, a double acting hydraulic ram and cylinder device, a reversible electric motor equipped with a solenoid released spring applied brake, or the like.

The ladle frame 50 comprises an elongated rectangular top assembly 56 having downwardly extending end members 58,60 at opposite ends thereof between which a further frame or structure 62, herein sometimes referred to as the ladle sub-frame, is supported by depending flexible members 64,66 in the present instance chains, of a second electric motor driven reversible dual drum hoist device 68 carried on the top of the part 56 of the ladle frame 50. In the disclosed embodiment the ladle sub-frame 62 supports a molten metal ladle 70 detachably fixed thereto but which may be a permanent part of the assembly 62 if desired. Having the ladle removable facilitates maintenance, such as, relining of the ladle. The ladle 70 is provided with a pouring spout the end 72 of which projects to the right as viewed in FIG. 2 beyond the right-hand side of the carrier B to facilitate the pouring of molten metal into a mold, such as, the mold E shown in dot-dash lines in FIG. 2. The mold E may be one of a series of molds supported on cars F movable along a surface track G parallel with the overhead monorail track B.

When the ladle sub-frame 62 is raised or lowered relative to the ladle frame 50 by the hoist 68 it is caused to rotate about an axis parallel with the length of the carrier A and the track B and offset to the right of the carrier A as viewed in FIG. 1 by the engagement of vertically and horizontally spaced pairs of rollers 74,75 and 76,77 on opposite ends of the sub-frame 62 which engage and travel in arcuate shaped guideways formed by pairs of inwardly facing channel members 80,82 and 84,86, respectively, fixed to sides of the end members 58,60 facing one another of the vertically movable ladle frame 50. In the embodiment shown the center of the arcuate guideway formed by the channel members 80,82, 84,86 coincide with an axis extending through the outer pouring end 72 of the spout part of the ladle 70 with the result that as the sub-frame 62 is raised by the hoist 68 the ladle is tilted or rotated in a clockwise direction as viewed in FIG. 2 about the outer end of its spout.

The movement of the various parts of the carrier B is under the control of an operator in the cab C assuming that the carriage 32 is in the correct vertical position and that the carrier A has been moved to align the end 72 of the spout of the ladle 70 with an opening in a mold, such as, the mold E, and the end of the spout is not directly over the opening in the mold the ladle frame 50 can be shifted along its runway formed by the channel members 40,42 until the desired aligned position of the ladle is attained. Thereafter the hoist 68 is operated to raise the ladle sub-frame 62 and tilt the ladle 70 in a clockwise direction to pour the molten metal therein into the mold. In doing so the ladle moves from the full line position shown in FIG. 2 towards and if desired past the dot-dash line position designated by the reference character P.

While the carrier A is traveling along the track B the center of gravity of the carrier and load can be maintained directly under the rail 10, if necessary, by shifting the ladle frame structure 50 along the channel members 40,42. During a pouring operation an off-center condition may exist imposing a force tending to pivot the carrier about the rail 10 in a clockwise direction as viewed in FIG. 2. To prevent any such tilting of the carrier at least during a pouring operation, with resulting misalignment of the end of the spout of the ladle and the opening in the mold the carrier A includes a member 90 extending from the frame structure 16 toward the left as viewed in FIG. 2 the outer end of which is provided with a roller 94 normally engageable with a carrier stabilizing rail 96 extending along at least that part of the track B where the molten metal in the ladle is poured into the mold. In the embodiment shown the roller 94 rotates about a horizontal axis and engages the underside of a rail 96, alternatively the rail 96 could provide a channel in the side facing the rail 12 and the roller 94 supported to engage in the channel thus preventing pivotal or rotational movement of the carrier proper in either clockwise or counterclockwise directions about the rail 12, as viewed in FIG. 2.

Figure 2:
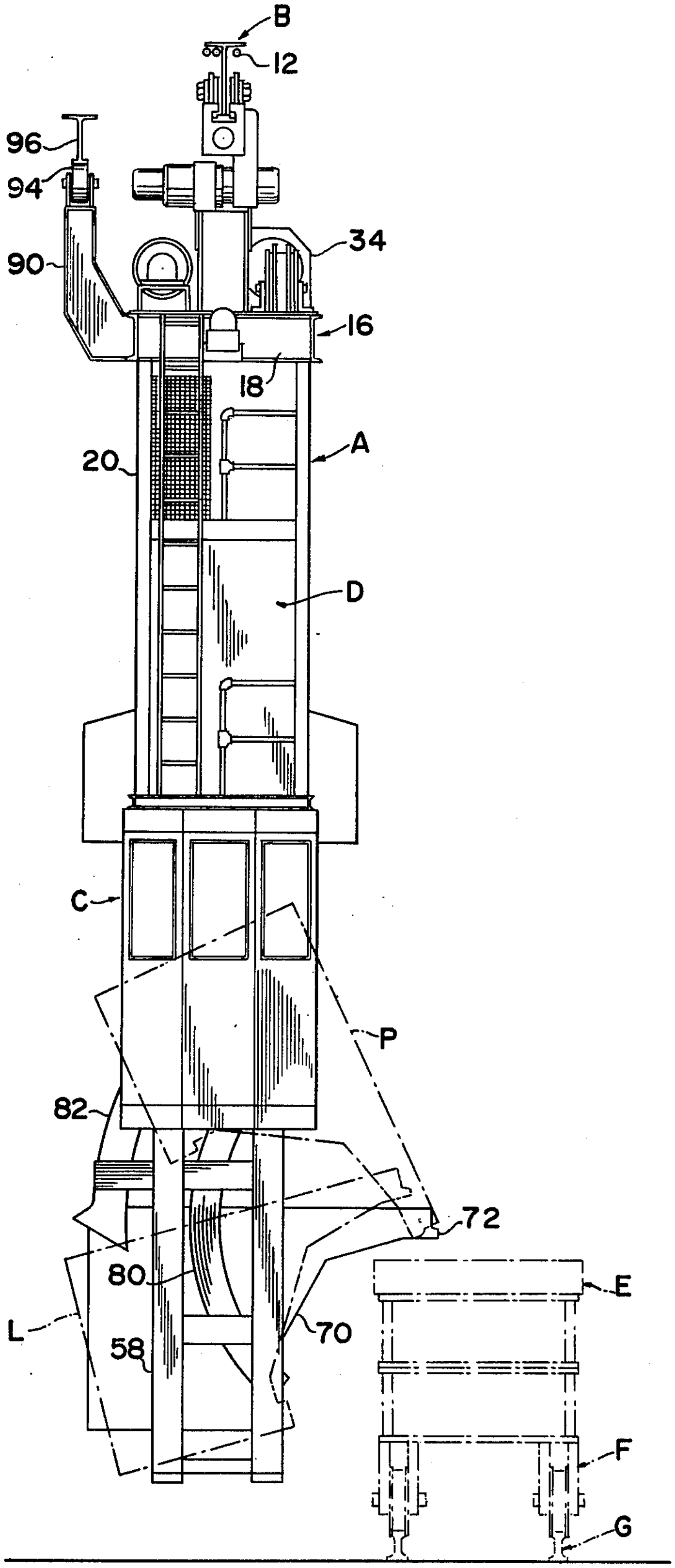
FIG. 2 is an elevation of the apparatus as viewed from the left of FIG. 1.
Figure 3:
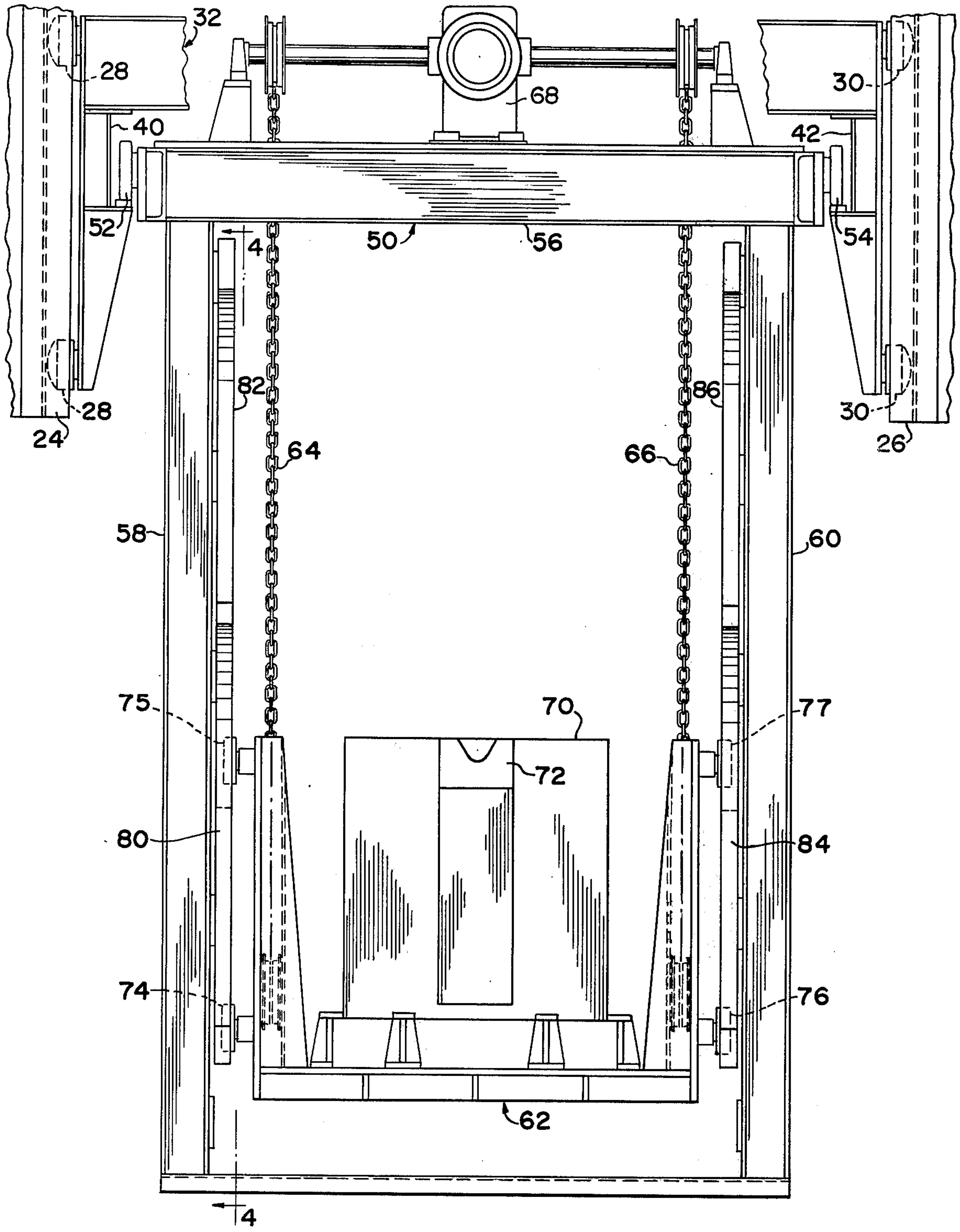
FIG. 3 is a fragmentary enlarged view of FIG. 1 with parts omitted or broken away.
Figure 4:
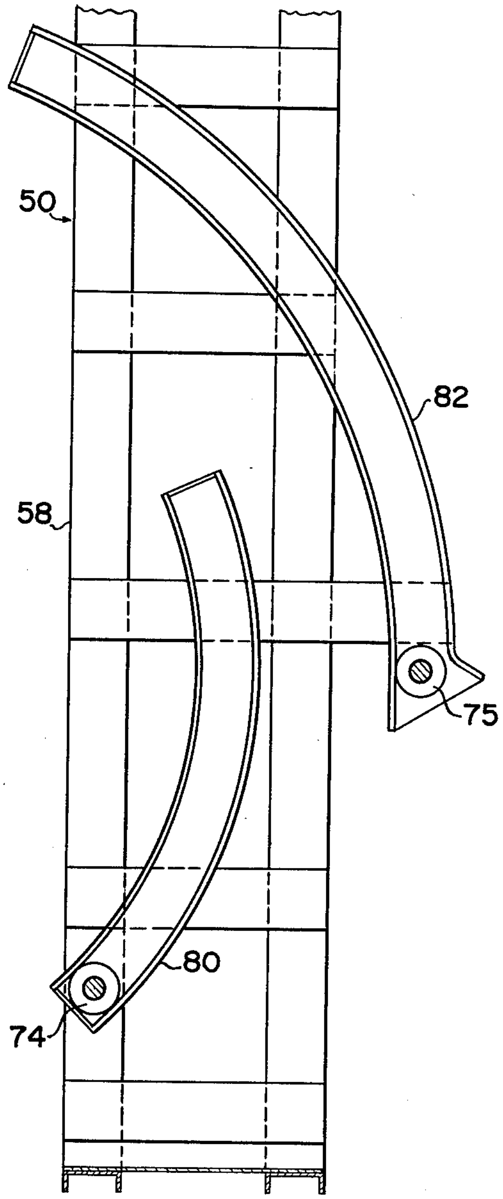
FIG. 4 is a fragmentary view approximately on the line 4—4 of FIG. 3.

Preferably the guideways formed by the channel members 80,82,84,86 are such that the ladle 70 can be tilted in a counterclockwise direction as viewed in FIG. 2 beyond or below a horizontal position as illustrated in dot-dash lines identified by the reference character L to facilitate loading of the ladle from the left or rear side, or to help in a deslagging operation.

From the foregoing description of the preferred embodiment of the invention it will be apparent that the objects heretofore enumerated and others have been accomplished and that there has been provided a novel and improved carrier for an overhead monorail track especially suited for the delivery of molten metal to a mold or molds. While the preferred embodiment has been shown and described in some detail it is to be understood that the invention may be otherwise embodied and it is the intention to hereby cover all adaptations, modifications and uses thereof which come within the practice of those skilled in the art to which the invention relates and the scope of the appended claims.

What is claimed is:

1. A carrier for an overhead monorail material handling system especially adapted for delivering molten metal to a series of molds, said carrier comprising a first frame assembly adapted for travel along an overhead monorail and having adjacent to its opposite ends members providing vertical guideways for a second frame assembly movable vertically along said vertical guideways by a power actuated reversible hoist supported on said first frame assembly, said second frame assembly including horizontal members extending transversely of the length thereof providing horizontal guideways for a third frame assembly movable horizontally along said horizontal guideways by reversible power actuated mechanism connected thereto and to said second frame assembly, a ladle assembly including a molten metal ladle provided with a pouring spout carried by said third frame assembly for movement relative thereto in a vertical direction, a power actuated reversible hoist on said third frame assembly for raising and lowering said ladle assembly relative to said third frame assembly, and cooperating circular arcuate guideways on said third frame assembly and followers on said ladle assembly for pivoting said ladle assembly about the end of said ladle pouring spout upon any movement of said ladle assembly relative to said third frame assembly in a vertical direction.

2. A carrier as claimed in claim 1 in which said first frame assembly includes a power actuated reversible motor for propelling it along a monorail upon which it is supported and an operator's station from which the operation of said power actuated reversible motor mechanism and hoists can be controlled.

3. A carrier as claimed in claim 1 in which the centers of the arcuate guideways are in line lengthwise with the path of travel of the first frame assembly with one another and the pouring spout of the ladle.

4. A carrier for an overhead monorail material handling system especially adapted for delivering molten metal to a series of molds, said carrier comprising a first frame assembly adapted for travel along an overhead monorail and having adjacent to its opposite ends members providing vertical guideways for a second frame assembly movable vertically along said vertical guideways by a power actuated reversible hoist supported on said first frame assembly, said second frame assembly including horizontal members extending transversely of the length thereof providing horizontal guideways for a third frame assembly movable horizontally along said horizontal guideways by reversible power actuated mechanism connected thereto and to said second frame assembly, a ladle assembly including a molten metal ladle provided with a pouring spout carried by said third frame assembly for movement relative thereto in a vertical direction, and a power actuated reversible hoist on said third frame assembly for raising and lowering said ladle assembly relative to said third frame assembly, said third frame assembly having circular arcuate guideways spaced from one another lengthwise of said first frame assembly and vetically relative to one another and said ladle assembly having vertically spaced followers engaging said guideways on said third frame assembly for pivoting said ladle assembly about the end of said ladle pouring spout upon any movement of said ladle assembly relative to said third frame assembly in a vertical direction.

* * * * *